US012204280B2

(12) United States Patent
Sakuta et al.

(10) Patent No.: US 12,204,280 B2
(45) Date of Patent: Jan. 21, 2025

(54) CARRIER, XEROGRAPHIC DEVELOPER, AND CARRIER PRODUCTION METHOD

(71) Applicant: POWDERTECH CO., LTD., Kashiwa (JP)

(72) Inventors: Aya Sakuta, Chiba (JP); Makoto Ishikawa, Chiba (JP); Hiroki Sawamoto, Chiba (JP); Tetsuya Uemura, Chiba (JP)

(73) Assignee: POWDERTECH CO., LTD., Kashiwa (JP)

( * ) Notice: Subject to any disclaimer, the term of this patent is extended or adjusted under 35 U.S.C. 154(b) by 206 days.

(21) Appl. No.: 17/430,440

(22) PCT Filed: Feb. 13, 2020

(86) PCT No.: PCT/JP2020/005501

§ 371 (c)(1),
(2) Date: Aug. 12, 2021

(87) PCT Pub. No.: WO2020/166654

PCT Pub. Date: Aug. 20, 2020

(65) Prior Publication Data

US 2022/0019151 A1 Jan. 20, 2022

(30) Foreign Application Priority Data

Feb. 13, 2019 (JP) ................................ 2019-023785

(51) Int. Cl.
*G03G 9/113* (2006.01)
*G03G 9/08* (2006.01)
*G03G 9/107* (2006.01)

(52) U.S. Cl.
CPC ......... *G03G 9/1134* (2013.01); *G03G 9/0819* (2013.01); *G03G 9/1075* (2013.01); *G03G 9/108* (2020.08); *G03G 9/1131* (2013.01); *G03G 9/1135* (2013.01)

(58) Field of Classification Search
CPC .... G03G 9/1134; G03G 9/108; G03G 9/0819; G03G 9/1075; G03G 9/1131; G03G 9/1135
See application file for complete search history.

(56) References Cited

U.S. PATENT DOCUMENTS

| | | | | |
|---|---|---|---|---|
| 4,902,597 A * | 2/1990 | Takeda | G03G 9/10884 430/111.3 |
| 2006/0121385 A1 | 6/2006 | Uemura et al. | |
| 2009/0029281 A1* | 1/2009 | Kikushima | G03G 9/09725 430/111.3 |
| 2009/0297974 A1* | 12/2009 | Kojima | G03G 9/1131 430/108.24 |
| 2011/0236813 A1* | 9/2011 | Kiyono | G03G 9/1139 430/108.1 |
| 2012/0058423 A1* | 3/2012 | Yamaguchi | G03G 9/1139 430/105 |
| 2017/0261875 A1* | 9/2017 | Takatsuna | G03G 9/1134 |
| 2019/0049871 A1 | 2/2019 | Sakamoto | |

FOREIGN PATENT DOCUMENTS

| | | | |
|---|---|---|---|
| EP | 1 657 595 | A2 | 5/2006 |
| EP | 3 441 821 | A1 | 2/2019 |
| JP | 2005-099489 | A | 4/2005 |
| JP | 2009-025487 | A | 2/2009 |
| JP | 2009-031416 | A | 2/2009 |
| JP | 2010-224054 | A | 10/2010 |
| JP | 4646781 | B2 | 3/2011 |
| JP | 5405159 | B2 | 2/2014 |
| JP | 2018-109666 | A | 7/2018 |
| JP | 2019-012166 | A | 1/2019 |
| WO | WO-2018/100900 | A1 | 6/2018 |

OTHER PUBLICATIONS

Laurence W. McKeen, 4—Binders, Editor(s): Laurence W. McKeen, In Plastics Design Library, Fluorinated Coatings and Finishes Handbook, William Andrew Publishing, 2006, pp. 45-58, ISBN 9780815515227, https://doi.org/10.1016/B978-081551522-7.50007-8. (Year: 2006).*

International Searching Authority, "International Search Report," issued in connection with International Patent Application No. PCT/JP2020/005501, dated May 19, 2020.

International Searching Authority, "Written Opinion," issued in connection with International Patent Application No. PCT/JP2020/005501, dated May 19, 2020.

* cited by examiner

*Primary Examiner* — Peter L Vajda
*Assistant Examiner* — Boone Alexander Evans
(74) *Attorney, Agent, or Firm* — Foley & Lardner LLP

(57) ABSTRACT

The present invention relates to a carrier including: a magnetic core material; and a resin coating layer coating a surface of the magnetic core material, in which the resin coating layer contains a binder resin, and fluorine element-containing resin particles dispersed in the binder resin, the resin coating layer has a coefficient of variation of a film thickness of 25% or less, and the resin coating layer has an average value of the number of the fluorine element-containing resin particles being 3 particles/$\mu m^2$ or more and 350 particles/$\mu m^2$ or less per unit area in a cross section of the resin coating layer, and has a coefficient of variation thereof being 20% or less.

5 Claims, No Drawings

CARRIER, XEROGRAPHIC DEVELOPER, AND CARRIER PRODUCTION METHOD

CROSS-REFERENCE TO RELATED APPLICATIONS

The present application claims priority under 37 U.S.C. § 371 to International Patent Application No. PCT/JP2020/005501, filed Feb. 13, 2020, which claims priority to and the benefit of Japanese Patent Application No. 2019-023785, filed on Feb. 13, 2019. The contents of these applications are hereby incorporated by reference in their entireties.

TECHNICAL FIELD

The present invention relates to a carrier in which the surface of a carrier core material is coated with a resin, a developer for electrophotography using the carrier, and a method for producing the carrier.

BACKGROUND ART

The electrophotographic development method is a method in which a toner in a developer is caused to adhere to electrostatic latent images formed on a photoreceptor to develop the images. Currently, as the electrophotographic development method, a magnetic brush method using a magnet roll is widely employed. The developer used in this method is classified into a two-component developer composed of a toner and a carrier and a one-component developer using only a toner.

In the two-component developer, the carrier is mixed and stirred with the toner and has functions for charging the toner and further carrying the toner. The two-component developer has better controllability on designing a developer in comparison with the one-component developer. Therefore, the two-component developer is widely used in a full-color development apparatus requiring a high image quality, a high-speed printing apparatus requiring reliability for maintaining image and durability, and the like.

The carrier and the toner are mixed and stirred in a developer tank. Due to heat generation and physical stress at that time, the toner may be fused to the surface of the carrier particles. This is called carrier spent. As the carrier spent progresses with the use of the developer, the charging characteristics of the carrier deteriorate with time, and image quality deterioration such as fogging, toner scattering, and the like occurs. Therefore, after a certain period of time has passed, it is necessary to replace the entire developer in the developer tank.

In order to extend the life of the developer, it is required to prevent the carrier spent. Conventionally, in order to prevent the carrier spent, the surface of a magnetic core material has been coated with a fluororesin. This is because, since the surface energy of the fluororesin is low, when the surface of the magnetic core material is coated with the fluororesin, the carrier spent can be prevented. On the other hand, since the fluororesin has poor adhesiveness to other materials, it is difficult to form a resin coating layer formed of only the fluororesin on the surface of the magnetic core material. Therefore, for example, as disclosed in Patent Literature 1 (JP-A-2005-99489), the surface of the magnetic core material is coated with a resin mixture of a fluororesin and a polyamide imide resin or the like. The polyamide imide resin or the like is used as a binder component for bringing the fluororesin into close contact with the surface of the magnetic core material.

In Patent Literature 1, as a method for forming a resin coating layer formed of the above-mentioned resin mixture on the surface of a magnetic core material, a method in which a fluororesin, a binder component such as a polyamide imide resin or the like, and a magnetic core material are heated while being mixed and stirred together with a solvent is employed. However, in such a method, it is difficult to uniformly mix the fluororesin and the binder component, and it is difficult to form a resin coating layer in which the fluororesin is uniformly dispersed with respect to the binder component on the surface of the magnetic core material.

Therefore, in Patent Literature 2 (Japanese Patent No. 4646781), it is proposed that a resin solution in which a fluororesin selected from a tetrafluoroethylene-hexafluoropropylene copolymer or a tetrafluoroethylene-perfluoroalkyl vinyl ether copolymer is dispersed, together with silicon oxide, in a polyamide imide resin solution in which a polyamide imide resin composed of a copolymer of trimellitic anhydride and 4,4'-diaminodiphenylmethane is dissolved in water is prepared, and the surface of a magnetic core material is coated with the resin solution, to thereby obtain a carrier in which the surface of the magnetic core material is coated with the resin mixture containing the fluororesin and the polyamide imide resin. Furthermore, Patent Literature 3 (Japanese Patent No. 5405159) describes that the above-mentioned resin solution is prepared by using a surfactant.

In these methods, since the fluororesin is dispersed in the polyamide imide resin solution, the mixed state of the fluororesin and the binder component becomes better than that in the method described in Patent Literature 1. However, since the polyamide imide resin solution has a high viscosity, it is still difficult to uniformly mix the fluororesin and the binder component even when the surfactant or the like is used. In addition, the wettability of the polyamide imide resin solution to the magnetic core material is low. Therefore, it is difficult to apply the resin solution to the surface of the magnetic core material with a uniform film thickness, and it is difficult to form the resin coating layer on the surface of the magnetic core material with a uniform film thickness. Thus, it is required to improve these points.

CITATION LIST

Patent Literature

Patent Literature 1: JP-A-2005-99489
Patent Literature 2: Japanese Patent No. 4646781
Patent Literature 3: Japanese Patent No. 5405159

SUMMARY OF INVENTION

Technical Problem

An object of the present invention is to provide a carrier having better spent resistance and charge stability than conventional carriers, a developer for electrophotography using the carrier, and a method for producing the carrier.

Solution to Problem

In order to solve the problem of the present invention, the carrier of the present invention is a carrier including: a magnetic core material; and a resin coating layer coating a surface of the magnetic core material, in which the resin coating layer contains a binder resin, and fluorine element-containing resin particles dispersed in the binder resin, the resin coating layer has a coefficient of variation of a film thickness of 25% or less, and the resin coating layer has an average value of the number of the fluorine element-containing resin particles being 3 particles/$\mu m^2$ or more and 350 particles/$\mu m^2$ or less per unit area in a cross section of the resin coating layer, and has a coefficient of variation thereof being 20% or less.

The carrier according to the present invention, preferably has a surface coverage of the magnetic core material by the resin coating layer being 60% or more and 95% or less.

In the carrier according to the present invention, the resin coating layer preferably has a mass ratio of contents of the fluorine element-containing resin particles and the binder resin being 9:1 to 2:8.

In the carrier according to the present invention, the fluorine element-containing resin particles preferably have a volume average particle diameter ($D_{50}$) of 0.05 μm or more and 0.40 μm or less.

In the carrier according to the present invention, the fluorine element-containing resin particles are preferably one kind or more selected from a tetrafluoroethylene-hexafluoropropylene copolymer and a tetrafluoroethylene-perfluoroalkyl vinyl ether copolymer.

In the carrier according to the present invention, the binder resin is preferably a polyimide resin.

In the carrier according to the present invention, the magnetic core material is preferably formed of a ferrite particle.

A developer for electrophotography of the present invention includes: the carrier according to the present invention; and a positively chargeable toner, in which the carrier imparts a positive chargeability to the toner.

A method for producing the carrier of the present invention is a method for producing a carrier including a magnetic core material, and a resin coating layer coating a surface of the magnetic core material, and includes: preparing a resin layer forming liquid in which fluorine element-containing resin particles and binder resin particles are dispersed in a dispersion medium; coating the surface of the magnetic core material with the resin layer forming liquid; and bringing the fluorine element-containing resin particles into close contact with the surface of the magnetic core material by the binder resin to form a resin coating layer containing the binder resin and the fluorine element-containing resin particles dispersed in the binder resin on the surface of the magnetic core material.

A method for producing the carrier of the present invention is a method for producing a carrier including a magnetic core material, and a resin coating layer coating a surface of the magnetic core material, and includes: preparing a resin layer forming liquid in which fluorine element-containing resin particles are dispersed in a binder resin dispersion liquid in which a liquid binder resin is dispersed (emulsified) in a dispersion medium in the form of micelles by using a surfactant; coating the surface of the magnetic core material with the resin layer forming liquid; and bringing the fluorine element-containing resin particles into close contact with the surface of the magnetic core material by the binder resin to form a resin coating layer containing the binder resin and the fluorine element-containing resin particles dispersed in the binder resin on the surface of the magnetic core material.

Advantageous Effects of Invention

According to the present invention, it is possible to provide a carrier having better spent resistance and charge stability than conventional carriers, and a method for producing the carrier.

DESCRIPTION OF EMBODIMENTS

Hereinafter, embodiments of a carrier, a developer for electrophotography, and a method for producing the carrier, according to the present invention will be described.

1. Carrier

First, an embodiment of a carrier according to the present invention will be described. The carrier according to the present invention is a carrier including a magnetic core material, and a resin coating layer coating a surface of the magnetic core material, and the resin coating layer contains a binder resin and fluorine element-containing resin particles dispersed in the binder resin. The fluorine element-containing resin has a low friction coefficient, and when the surface of the magnetic core material is coated with the resin coating layer in which the fluorine element-containing resin particles are dispersed in the binder resin, a toner can be prevented from adhering to the carrier. On the other hand, the fluorine element-containing resin particles have low adhesiveness to the magnetic core material. When the fluorine element-containing resin is dispersed in the binder resin, the binder resin can allow the fluorine element-containing resin to satisfactorily adhere to the surface of the magnetic core material. By employing such a configuration, even when the carrier collides with the toner during stirring with the toner or the like, the toner is less likely to adhere to the surface of the carrier, and the carrier spent can be prevented.

In addition, when the carrier is produced by the method described later, the fluorine element-containing resin particles can be satisfactorily dispersed in the binder resin, and a resin coating layer having a uniform film thickness can be obtained. Therefore, according to the carrier of the present invention, it is possible to obtain a developer for electrophotography having a sharp charge amount distribution, and good spent resistance, charge stability and replenishment fogging properties. Hereinafter, the magnetic core material and the resin coating layer will be described in this order.

(1) Magnetic Core Material

In the present invention, for example, the magnetic core material is not particularly limited as long as the material satisfies the magnetism or the like required for a carrier of a developer for electrophotography, and use can be made of a magnetic core material formed of a mixture of a magnetic component such as ferrite and a non-magnetic component such as resin, or the like. However, in the present invention, various ferrites can be preferably used as the magnetic core material, and spherical ferrite can be more preferably used. The composition of ferrite is not particularly limited, but for example, ferrite preferably has a composition represented by the following formula.

$$(MnO)_x(MgO)_y(Fe_2O_3)_z$$

Here, x+y+z=100 mol %;
x=35 mol % to 45 mol %;
y=5 mol % to 15 mol %; and
z=40 mol % to 55 mol %.

Here, in the above-mentioned formula, (MnO) and/or (MgO) may be partially substituted with one or more oxides selected from SrO, $Li_2O$, CaO, TiO, CuO, ZnO, NiO, $Bi_2O_3$, and $ZrO_2$. At this time, (MnO) and/or (MgO) may be more preferably partially substituted with SrO.

Ferrite having such a composition has high magnetization and good magnetization uniformity. That is, a carrier having excellent image quality and durability can be obtained with little variation in magnetization among particles. Therefore, in the present invention, ferrite having a composition represented by the above-mentioned formula can be preferably used.

In the above-mentioned formula, in the case where (MnO) and/or (MgO) is partially substituted with one or more oxides selected from the oxides listed above, the substitution amount thereof is preferably 0.35 mol % or more and 5.0 mol % or less. In the case where the substitution amount is set to 0.35 mol % or more and 5.0 mol % or less, variation in magnetization among particles is more easily reduced. In addition, generation of residual magnetization and coercive force in ferrite can be reduced and aggregation among particles can be suppressed. In order to obtain the effect, the substitution amount is more preferably 3.5 mol % or less.

In the present specification, ferrite means an aggregate of individual ferrite particles unless otherwise specified.

(2) Resin Coating Layer

The resin coating layer contains a binder resin and fluorine element-containing resin particles dispersed in the binder resin.

a) Fluorine Element-Containing Resin Particles

The fluorine element-containing resin refers to a resin containing fluorine in its molecular structure, and in particular, a resin obtained by polymerizing a fluorine-containing olefin (mainly a fluororesin).

Examples of the fluorine element-containing resin include fluororesins such as polytetrafluoroethylene (tetrafluoroethylene resin (PTFE)), polychlorotrifluoroethylene (trifluoroethylene resin (PCTFE, CTFE)), polyvinylidene fluoride (PVDF), polyvinyl fluoride (PVF), tetrafluoroethylene-perfluoroalkyl vinyl ether copolymer (perfluoroalkoxy fluororesin (PFA), tetrafluoroethylene-hexafluoropropylene copolymer (FEP), ethylene-tetrafluoroethylene copolymer (ETFE), and ethylene-chlorotrifluoroethylene copolymer (ECTFE).

In the present invention, as the fluorine element-containing resin, in particular, use can be preferably made of one or more selected from tetrafluoroethylene-perfluoroalkyl vinyl ether copolymer (PFA) and tetrafluoroethylene-hexafluoropropylene copolymer (FEP). While tetrafluoroethylene-perfluoroalkyl vinyl ether copolymer (PFA) and tetrafluoroethylene-hexafluoropropylene copolymer (FEP) have equivalent chemical resistance, heat resistance and electrical properties to polytetrafluoroethylene, they have excellent wear resistance and workability as compared to polytetrafluoroethylene. Furthermore, the fluorine element-containing resins mentioned here also have excellent coatability when forming a resin coating layer by the method described later. Therefore, the characteristics required for a resin coating layer provided on the magnetic core material are satisfied, and the handling thereof is good.

The volume average particle diameter ($D_{50}$) of the fluorine element-containing resin particles is preferably 0.05 μm or more and 0.40 μm or less. When such fine particles of the fluorine element-containing resin particles are dispersed in the binder resin, the fluorine element-containing resin particles can be uniformly dispersed in the resin coating layer having a thickness of about 0.5 μm to 2.0 μm so that the film thickness of the resin coating layer can be easily made uniform. In the case where the value of the volume average particle diameter ($D_{50}$) of the fluorine element-containing resin particles becomes small, it is difficult to suppress the aggregation of the fluorine element-containing resin particles. From this point of view, the volume average particle diameter ($D_{50}$) of the fluorine element-containing resin particles is more preferably 0.08 μm or more, and even more preferably 0.10 μm or more. On the other hand, in the case where the volume average particle diameter ($D_{50}$) of the fluorine element-containing resin particles becomes large, it is difficult to firmly bring the fluorine element-containing resin particles into close contact with the surface of the magnetic core material even when a binder resin is used, and the fluorine element-containing resin particles are easily separated from the resin coating layer. From this point of view, the volume average particle diameter ($D_{50}$) of the fluorine element-containing resin particles is more preferably 0.35 μm or less, and even more preferably 0.30 μm or less.

b) Binder Resin

The binder resin is a resin used to bring the fluorine element-containing resin particles into close contact with the surface of the magnetic core material. The type of binder resin is not particularly limited as long as it is a resin that can bring the fluorine element-containing resin particles into close contact with the surface of the magnetic core material and satisfies the characteristics required for the carrier. For example, a polyimide resin, a polyamide imide resin or the like can be used. When a resin coating layer is formed on the surface of the magnetic core material, in the case where a resin layer forming liquid is prepared by dispersing a binder resin in a dispersion medium instead of dissolving the binder resin in a solvent, such as a resin layer forming liquid in which a particulate binder resin (binder component) is dispersed (suspended) in a dispersion medium together with fluorine element-containing resin particles, a resin layer forming liquid in which a liquid binder resin is dispersed (emulsified) in a dispersion medium in the form of micelles by using a surfactant, or the like, the fluorine element-containing resin particles and the binder resin can be satisfactorily mixed and a resin layer forming liquid having low viscosity can be obtained. Thus, a resin coating layer having good coatability and uniform film thickness without localization of the fluorine element-containing resin particles on the surface of the core material particles can be obtained. The method for preparing the resin layer forming liquid will be described later. Furthermore, the method for producing the carrier according to the present invention is not limited to the method described later, and the state of the binder resin and the method for preparing the resin layer forming liquid can be appropriately changed.

In the carrier according to the present invention, a polyimide resin is particularly preferably used as a binder resin. The polyimide resin is generally a thermosetting resin, but a thermoplastic polyimide resin also exists. In each case, the adhesion between the polyimide resin and an inorganic material such as ferrite is good. In addition, the polyimide resin has high heat resistance. Therefore, in the case where the polyimide resin is used as the binder resin, the fluorine element-containing resin can be firmly brought into close contact with the surface of the magnetic core material.

Furthermore, the heat shrinkage of the polyimide resin is lower than that of the polyamide imide resin that is conventionally used as a binder resin when the surface of the magnetic core material is coated with a fluorine element-containing resin (fluororesin). Generally, in the carrier production step, after the surface of the magnetic core material is coated with a resin, a heat treatment called heating, curing or the like may be performed. Therefore, even when the surface of the magnetic core material is completely coated with the resin, the resin may shrink during the heat treatment to expose a part of the surface of the magnetic core material. In the case where the polyimide resin is used as the binder resin, the shrinkage during the heat treatment is small as compared with the case where the polyamide imide resin is used as the binder resin, so that the surface of the magnetic core material can be prevented from being exposed. Since the resin coverage on the surface of the magnetic core material is high and the exposure of the magnetic core material that causes resin peeling is reduced, a carrier having higher durability than the conventional carriers can be obtained. The polyimide resin may be any resin having an imide bond in the main chain, and is not particularly limited. For example, an aromatic polyimide resin or the like can be used.

c) Film Thickness

The film thickness of the resin coating layer is preferably 0.5 μm or more and 2.0 μm or less. In the case where the film thickness of the resin coating layer is within the above-mentioned range, resin peeling can be suppressed and good charge imparting ability to the toner can be obtained. Here, the film thickness of the resin coating layer is a value measured by the method described later.

In the carrier, the coefficient of variation of the film thickness of the resin coating layer is 25% or less. In the case where the coefficient of variation of the film thickness of the resin coating layer obtained by the above-mentioned method is 25% or less, the fluorine element-containing resin particles are satisfactorily dispersed in the binder resin, and a carrier having higher spent resistance and charge stability than the conventional carriers is obtained. On the other hand, in the case where the coefficient of variation of the film thickness of the resin coating layer is more than 25%, the distribution of the fluorine element-containing resin particles in the binder resin becomes non-uniform, and the fluorine element-containing resin particles are localized in the resin coating layer. Therefore, this case is not preferable because the spent resistance and the charge stability deteriorate. Here, the coefficient of variation of the film thickness of the resin coating layer is a value obtained by the method described later.

d) Abundance and Coefficient of Variation of Fluorine Element-Containing Resin Particles Per Unit Area The average value of the number of fluorine element-containing resin particles per unit area in the cross section of the resin coating layer is 3 particles/$\mu m^2$ or more and 350 particles/$\mu m^2$ or less, and the coefficient of variation thereof is 20% or less.

In the case where the average value of the number of fluorine element-containing resin particles per unit area in the cross section of the resin coating layer is 3 particles/$\mu m^2$ or more and 350 particles/$\mu m^2$ or less, the content of the fluorine element-containing resin particles in the binder resin is appropriate, and the effect of improving spent resistance and charge stability or the like, obtained by adding the fluorine element-containing resin particles, can be sufficiently exhibited.

On the other hand, in the case where the average value of the number of fluorine element-containing resin particles per unit area in the cross section of the resin coating layer is less than 3 particles/$\mu m^2$, the content of the fluorine element-containing resin particles in the resin coating layer is small, and it is difficult to sufficiently exhibit the effect obtained by adding the fluorine element-containing resin particles. From this point of view, the average value of the number of fluorine element-containing resin particles per unit area in the cross section of the resin coating layer is preferably 5 particles/$\mu m^2$ or more, more preferably 8 particles/$\mu m^2$ or more, even more preferably 10 particles/$\mu m^2$ or more, and still even more preferably 11 particles/$\mu m^2$ or more.

On the other hand, in the case where the average value of the number of fluorine element-containing resin particles is more than 350 particles/$\mu m^2$, the content of the fluorine element-containing resin particles in the resin coating layer is large, the coefficient of variation of the film thickness of the resin coating layer tends to increase over the value described above, and there is a risk that the distribution of the fluorine element-containing resin particles in the resin coating layer is non-uniform. Therefore, this case is not preferable. From this point of view, the average value of the number of fluorine element-containing resin particles per unit area in the cross section of the resin coating layer is preferably 300 particles/$\mu m^2$ or less, more preferably 280 particles/$\mu m^2$ or less, even more preferably 250 particles/$\mu m^2$ or less, still even more preferably 200 particles/$\mu m^2$ or less, and still even more preferably 150 particles/$\mu m^2$ or less.

However, the preferable range of the average value of the number of fluorine element-containing resin particles varies also depending on the value of the volume average particle diameter ($D_{50}$) of the fluorine element-containing resin particles, the particle diameter distribution thereof and the like. For example, in the case where fluorine element-containing resin particles having a volume average particle diameter ($D_{50}$) of about 0.15 μm to 0.35 μm are used, the average value of the number of the fluorine element-containing resin particles is preferably 5 particles/$\mu m^2$ or more and 20 particles/$\mu m^2$ or less, and more preferably 8 particles/$\mu m^2$ or more and 16 particles/$\mu m^2$ or less.

The coefficient of variation of the average value of the number of fluorine element-containing resin particles per unit area in the cross section of the resin coating layer is 20% or less as described above, more preferably 18% or less, even more preferably 15% or less, and still even more preferably 10% or less. The smaller the value of the coefficient of variation, the more uniform the distribution of the fluorine element-containing resin particles in the resin coating layer, and each characteristic of the carrier, such as charge amount distribution, spent resistance, charge stability, and replenishment fogging properties, is sharp and good.

Here, the average value of the number of fluorine element-containing resin particles per unit area in the cross section of the resin coating layer and the coefficient of variation thereof are values measured and calculated by the method described later.

e) Content Ratio of Fluorine Element-Containing Resin Particles and Binder Resin The mass ratio of the contents of the fluorine element-containing resin particles and the binder resin in the resin coating layer is preferably as follows.

Fluorine element-containing resin particles:binder resin=9:1 to 2:8

Since fluorine imparts a small surface energy, the higher the content of the fluorine element-containing resin particles in the resin coating layer, the better the spent resistance and charge stability of the obtained carrier can be achieved. From this point of view, the content of the fluorine element-containing resin particles in the resin coating layer is preferably 2/10 or more, more preferably 3/10 or more, and even more preferably 4/10 or more.

On the other hand, the adhesion of the fluorine element-containing resin particles themselves to the surface of the magnetic core material is low. Therefore, in the case where the content of the binder resin in the resin coating layer is less than 1/10, there is a risk that the fluorine element-containing resin is separated from the surface of the magnetic core material due to heat generation and physical (mechanical) stress received during stirring with the toner or the like. Therefore, from the viewpoint of obtaining a carrier having high durability capable of maintaining spent resistance and charge stability for a long period of time, the content of the binder resin in the resin coating layer is preferably 1/10 or more.

However, the lower limit of the content of the binder resin and the upper limit of the fluorine element-containing resin in the resin coating layer are not particularly limited originally from the viewpoint of improving spent resistance and charge stability. As long as the fluorine element-containing resin can be brought into close contact with the surface of the magnetic core material, even cases where the content of the binder resin is less than 1/10 and the content of the fluorine element-containing resin is more than 9/10 are included in the present invention.

f) Coating Amount

In addition, although the surface of the carrier core material is coated with the resin mixture including the fluorine element-containing resin particles and the binder resin, the coating amount of the magnetic core material with the resin mixture is preferably 0.01 parts by mass or more and 10 parts by mass or less, more preferably 0.3 parts by mass or more and 7 parts by mass or less, and even more preferably 0.5 parts by mass or more and 5 parts by mass or less with respect to 100 parts by mass of the magnetic core material. In the case where the coating amount of the magnetic core material with the resin mixture is less than 0.01 parts by mass, it is difficult to form a resin coating layer on the surface of the magnetic core material with a uniform thickness. Furthermore, in the case where the coating amount of the magnetic core material with the resin mixture is more than 10 parts by mass, aggregation among carriers easily occurs, and the fluidity of the carrier is lowered. Therefore, carrier adhesion or the like easily occurs, and deterioration in productivity such as a decrease in yield is caused. Furthermore, since the fluidity of the carrier is low, the stirring properties of the toner in the actual machine deteriorate, the toner cannot be sufficiently charged, and the toner cannot be satisfactorily carried to an electrostatic latent image, which lead to a variation in development characteristics.

g) Surface Coverage

In the carrier, the surface coverage of the magnetic core material with the resin coating layer is preferably 60% or more and 95% or less. Here, the resin coverage is a value calculated by the method described later.

h) Charge Control Agent/Conductive Agent

In the resin coated carrier, in general, various additives for controlling the charging characteristics on the carrier surface, such as a charge control agent and a conductive agent, can be contained in the resin coating layer.

For example, a silane coupling agent is known as a charge control agent. Carriers used with a negative polarity toner can contain an aminosilane coupling agent in the resin coating layer, and carriers used with a positive polarity toner can contain a fluorine-based silane coupling agent in the resin coating layer. In addition, as a conductive agent, the resin coating layer can contain conductive fine particles such as an organic conductive agent such as conductive carbon and an inorganic conductive agent such as titanium oxide or tin oxide. The charge control agent and the conductive agent are optional additives that can be added as needed.

(3) Volume Average Particle Diameter

The carrier according to the present invention is desirably spherical, and the volume average particle diameter thereof is preferably 20 μm or more and 100 μm or less, and more preferably 30 μm or more and 70 μm or less. In the case where the volume average particle diameter of the carrier is less than 20 μm, the carriers easily aggregate and carrier adhesion easily occurs. Carrier adhesion is not preferable since it causes white spots. On the other hand, in the case where the volume average particle diameter of the carrier is more than 100 μm, the carrier becomes too large and it is difficult to develop an electrostatic latent image with high definition. That is, since the image quality becomes poor and the desired resolution is less likely to be obtained, this case is not preferable.

The volume average particle diameter can be measured by using a micro-track particle size analyzer (Model 9320-X100) manufactured by Nikkiso Co., Ltd., for example, as follows. Into a 100 ml beaker are put 10 g of a sample and 80 ml of water, and thereto are added 2 drops to 3 drops of a dispersant (sodium hexametaphosphate). Then, the mixture is dispersed for 20 seconds by using an ultrasonic homogenizer (UH-150 type, manufactured by SMT. Co. Ltd.) at an output power level set at 4, and foams formed on a surface of the beaker are removed, to thereby prepare a sample. The sample is used to measure the volume average particle diameter of the sample with the micro-track particle size analyzer.

2. Method for Producing Carrier

Next, an embodiment of a method for producing a carrier according to the present invention will be described. The method for producing a carrier according to the present invention is a method for producing a carrier in which a surface of a magnetic core material is coated with a resin, and includes preparing a resin layer forming liquid in which fluorine element-containing resin particles and binder resin particles are dispersed in a dispersion medium, coating the surface of the magnetic core material with the resin layer forming liquid, and bringing the fluorine element-containing resin particles into close contact with the surface of the magnetic core material by the binder resin to form a resin coating layer containing the binder resin and the fluorine element-containing resin particles dispersed in the binder resin on the surface of the magnetic core material. Hereinafter, each step will be described in order.

(1) Magnetic Core Material

As described above, the magnetic core material is not particularly limited in the present invention. Here, an example of a method for producing the magnetic core material is described below, but in the present invention, the method for producing the magnetic core material is not limited to the following method.

First, an appropriate amount of a ferrite raw material is weighed so as to have a predetermined composition, water is added thereto, and the mixture is pulverized and mixed with a ball mill, a vibration mill or the like for 0.5 hours or longer, preferably 1 to 20 hours. At that time, in the case where MnO and/or MgO is partially substituted with another oxide, a predetermined amount of the oxide is also mixed. The slurry thus obtained is dried, further pulverized, and then calcined at a temperature of 700° C. to 1,200° C. In the case where it is desired to obtain a ferrite particle having a low apparent density or the like, a step of calcination may be omitted.

Next, the calcined product is pulverized to 15 μm or less, preferably 5 μm or less, and more preferably 2 μm or less with a ball mill, a vibration mill or the like, and then water and, as necessary, a dispersant, a binder and the like are added thereto to prepare a slurry. After adjusting the viscosity of the slurry, granulation is carried out by a spray dryer or the like. The obtained granulated product is held at a temperature of 1,000° C. to 1,500° C. for 1 hour to 24 hours in an atmosphere in which oxygen concentration is controlled to a predetermined concentration, to thereby carry out sintering.

The sintered product thus obtained by the sintering is pulverized and classified as needed. When pulverizing, the sintered product can be pulverized with a ball mill, a vibration mill or the like. As the classification method, conventional method such as an air classification method, a mesh filtration method, a precipitation method, or the like can be employed. The sintered product is preferably size-regulated to a desired particle diameter through classification.

Thereafter, as necessary, an oxide film treatment can be performed on the surface of the sintered product, thereby regulating the electric resistance. The oxide film treatment can be performed by heat treatment on the surface of the sintered product, for example, at a low temperature of 300° C. to 700° C. by using a common rotary electric furnace, batch electric furnace or the like. The thickness of the oxide film formed on the surface of the ferrite particles by the oxide film treatment is preferably 0.1 nm to 5 μm. In the case where the thickness of the oxide film is less than 0.1 nm, the effect obtained by applying the oxide film treatment to the surface of the sintered product is reduced, and the electric resistance cannot be sufficiently adjusted. On the other hand, in the case where the thickness of the oxide film is more than 5 μm, the magnetization of the obtained ferrite particles is lowered or the resistance is too high, and thus, problems such as a decrease in developing capability or the like easily occur. Furthermore, as necessary, a reduction treatment may be performed before the oxide film treatment. Through these steps, a magnetic core material formed of ferrite particles can be obtained.

(2) Resin Layer Forming Liquid Preparation Step

In order to obtain the carrier according to the present invention, it is preferable that a resin layer forming liquid is prepared by dispersing a binder resin in a dispersion medium instead of dissolving the binder resin in a solvent. For the preparation of the resin layer forming liquid, for example, the following a) first method or b) second method is preferably employed.

a) First Method

First, when coating the surface of the magnetic core material with a resin layer forming liquid, first, a resin layer forming liquid in which fluorine element-containing resin particles and binder resin particles are dispersed in a dispersion medium is prepared.

According to this method, since the fluorine element-containing resin particles and the binder resin particles are dispersed in the dispersion medium, the resin layer forming liquid can be prepared while the viscosity of the resin layer forming liquid is kept low. For example, in the case where the binder resin is dissolved in a solvent, the viscosity of the resin layer forming liquid is increased, it is difficult to disperse therein the fluorine element-containing resin particles satisfactorily, and the coatability also deteriorates. On the other hand, in the method, since the fluorine element-containing resin particles and the binder resin particles are dispersed in the dispersion medium, the fluorine element-containing resin particles and the binder resin particles can be satisfactorily mixed, and the viscosity of the resin layer forming liquid can be kept low. Thus, coatability is also excellent. Therefore, the resin coating layer is easily formed on the surface of the magnetic core material with a uniform film thickness, and localization of the fluorine element-containing resin particles in the resin coating layer can be prevented. Therefore, according to the method, it is possible to provide a developer for electrophotography having a sharp charge amount distribution and good spent resistance, charge stability and replenishment fogging properties.

As the fluorine element-containing resin particles, powders of various fluorine element-containing resins exemplified above can be used. The powder of the fluorine element-containing resin is preferably dispersed in a dispersion medium. The volume average particle diameter of the fluorine element-containing resin powder (fluorine element-containing resin particles) is preferably 0.05 μm to 0.80 μm. In addition, the upper limit of the volume average particle diameter of the fluorine element-containing resin particles is more preferably 0.40 μm and even more preferably 0.30 μm. Furthermore, the lower limit of the volume average particle diameter of the fluorine element-containing resin is more preferably 0.10 μm and even more preferably 0.12 μm.

In the present invention, the various resins listed above can be used as the binder resin, and the specific molecular structure, molecular weight and the like of each binder resin are not particularly limited. The binder resin is preferably a solid (powder) at the normal temperature and is insoluble in the dispersion medium.

For example, in the case where polyimide resin particles are used as a binder, in general, there are thermosetting polyimide resins and thermoplastic polyimide resins, but as described above, any of a thermosetting polyimide resin and a thermoplastic polyimide resin can be used. In the case where a thermosetting polyimide resin is used, for example, when a dispersion medium containing a strong alkaline agent is used, a part of the polyimide resin particles is hydrolyzed and decomposed into a low molecular weight substance when heated in a curing step or the like, and repolymerized to exhibit a function as a binder resin. In addition, in the case where the thermoplastic polyimide resin is used, the resin melts when heated in a curing step or the like, and exhibits a function as a binder resin.

In addition, as the polyamide imide resin, any of a thermosetting polyamide imide resin and a thermoplastic polyamide imide resin can be used.

In any case, the volume average particle diameter of the binder resin particles used when preparing the resin coating layer forming liquid is preferably 0.01 μm or more and 0.30 μm or less. In the case where the binder resin particles having equivalent particle diameter to or a smaller particle diameter than that of the fluorine element-containing resin particles are used, the fluorine element-containing resin particles and the binder resin particles can be satisfactorily mixed and dispersed in the dispersion medium.

Furthermore, from the viewpoint of satisfactorily dispersing the fluororesin-containing resin particles and the binder resin particles in the dispersion medium, a surfactant is preferably added to the dispersion medium. In addition, in order to satisfactorily disperse the fluororesin-containing resin particles and the binder resin particles in the dispersion medium with a surfactant, the dispersion medium is preferably water.

The content ratio of the fluorine element-containing resin particles and the binder resin particles in the resin layer forming liquid is the same as the content ratio of the fluorine element-containing resin particles and the binder resin in the resin coating layer, and is preferably in the following range. Since the matters concerning the content ratio of the fluorine element-containing resin particles and the binder resin particles in the resin layer forming liquid are the same as the matters concerning the content ratio of the fluorine element-containing resin particles and the binder resin in the resin coating layer, the description thereof is omitted here.

Fluorine element-containing resin particles:binder resin=9:1 to 2:8

The resin component concentration in the resin layer forming liquid is preferably 10% by mass to 40% by mass. The resin component concentration used here refers to a value obtained by expressing the content of the mixed resin component (solid content) of the fluorine element-containing resin particles and the binder resin particles with respect to the dispersion medium as a percentage (mass). The resin component concentration in the resin layer forming liquid can be appropriately adjusted in consideration of workability when the surface of the magnetic core material is coated with the resin layer forming liquid.

When preparing the resin layer forming liquid, 1.0 part by mass or more and 50 parts by mass or less of the surfactant is preferably added in the case where the total amount of the fluorine element-containing resin and the binder resin particles is 100 parts by mass. In the case where the surfactant is added to the dispersion medium when preparing the resin layer forming liquid, it is possible to improve the dispersion of the fluorine element-containing resin particles and the binder resin particles with respect to the dispersion medium.

The type of surfactant is not particularly limited, and various surfactants can be used. The surfactants are roughly classified into ionic surfactants and nonionic surfactants (non-ionic surfactants), and the ionic surfactants are further classified into anionic surfactants, cationic surfactants and amphoteric surfactants. Any of these surfactants may be used.

However, from the viewpoint of stably maintaining the charge amount of the carrier, a nonionic surfactant is preferably used. Since the hydrophilic group of the ionic surfactant is ionic, the charge amount of the carrier varies depending on the content of the ionic surfactant. Therefore, in the case where an ionic surfactant is used, the electrical characteristics of the carrier may be affected depending on the content. On the other hand, in the case of using a nonionic surfactant, since the hydrophilic group is nonionic, the effect of the content of the surfactant and the like on the electrical characteristics of the carrier is small. Therefore, the charge amount of the carrier is easily appropriately controlled in the case where the nonionic surfactant is used as compared with the case where the ionic surfactant is used.

As the nonionic surfactant, for example, an ether surfactant, an ester surfactant and the like can be used. Examples of the ether surfactant include polyoxyethylene alkyl ether, polyoxyethylene alkyl phenyl ether, polyoxyethylene alkyl allyl ether, polyoxyethylene polyoxypropylene glycol, and the like. Examples of the ester surfactant include polyoxyethylene fatty acid ester, sorbitan fatty acid ester, glycerin fatty acid ester, oxyethylene-oxypropylene block polymer, and the like.

Examples of the anionic surfactant include fatty acid salts such as sodium oleate and castor oil, alkylsulfate esters such as sodium laurylsulfate and ammonium laurylsulfate, alkylbenzene sulfonates such as sodium dodecylbenzene sulfonate, alkylnaphthalenesulfonates, alkylphosphate ester salts, naphthalenesulfonic acid-formalin condensates, polyoxyethylene alkylsulfate ester salts, and the like. Furthermore, examples of the cationic surfactant include alkylamine salts such as laurylamine acetate, quaternary ammonium salts such as lauryltrimethylammonium chloride and stearyltrimethylammonium chloride, and the like. Examples of the amphoteric surfactant include aminocarboxylate salts, alkylamino acids, and the like.

b) Second Method

As a second method, there is a method using a binder resin in a liquid state when preparing a resin layer forming liquid. Specifically, according to the following method, the carrier according to the present invention can be obtained even when the binder resin in a liquid state is used. In the case where the liquid binder resin is used, the liquid binder resin is dispersed (emulsified) in the form of micelles in a dispersion medium by using the above-mentioned surfactant instead of dissolving the binder resin in a solvent. In the case where the resin layer forming liquid is prepared in this manner, the fluorine element-containing resin particles and the binder resin can be satisfactorily mixed without increasing the viscosity of the resin layer forming liquid, good coatability is improved, and the carrier according to the present invention can be obtained.

(3) Coating Step

Next, the coating step will be described. The method for coating the surface of the magnetic core material with the resin layer forming liquid is not particularly limited, and for example, a brush coating method, a spray drying method using a fluidized bed, a rotary drying method, an immersion drying method using a universal stirrer, and the like can be used.

In addition, after coating the surface of the magnetic core material with the resin layer forming liquid, heat treatment may be appropriately performed by using an external heating system using a fixed electric furnace, a fluidized electric furnace, a rotary electric furnace, or a burner furnace, or by using an internal heating system using a microwave. The heat treatment is generally referred to as heating or curing. In the case where the thermosetting resin is used as the binder resin, the binder resin can be cured by performing the heat treatment, and the fluorine element-containing resin can be firmly brought into close contact with the surface of the magnetic core material by the binder resin.

The carrier according to the present invention can be obtained by the above-described steps.

3. Developer for Electrophotography

Next, a developer for electrophotography according to the present invention will be described. In the developer for electrophotography according to the present invention, the above-mentioned carrier according to the present invention is used. The developer for electrophotography according to the present invention is particularly preferably a two-component developer for electrophotography containing the above-described carrier and a toner.

In the developer for electrophotography of the present invention, the toner used together with the above-described carrier is not particularly limited. For example, various toners produced by known methods such as suspension polymerization method, emulsion polymerization method, pulverization method, and the like can be used. For example, use can be made of a toner that is obtained by sufficiently mixing a binder resin, a colorant, a charge control agent, and the like in a mixing machine such as a Henschel mixer, then melting and kneading the mixture by a twin-screw extruder or the like to uniformly disperse the mixture, cooling the molten mixture, then finely pulverizing the obtained material in a jet mill or the like, followed by classification, and classifying the resultant with an air classifier or the like to have a desired particle diameter. When producing the toner, a wax, magnetic powder, a viscosity modifier, and other additives may be added as necessary. Furthermore, an external additive can be added after the classification.

The binder resin used when producing the above-mentioned toner is not particularly limited, and resins such as polystyrene, chloropolystyrene, styrene-chlorostyrene copolymers, styrene-acrylic ester copolymers, styrene-methacrylic acid copolymers, rosin-modified maleic acid resins, epoxy resins, polyester, polyethylene, polypropylene, polyurethane, and silicone resins can be used alone or as a combination thereof as necessary.

Examples of the charge control agent used when producing the toner include nigrosine dyes, quaternary ammonium salts, organic metal complexes, chelate complexes, metallized monoazo dyes, and the like.

Conventionally known dyes and/or pigments can be used as the colorant used when producing the toner. For example, carbon black, phthalocyanine blue, permanent red, chrome yellow, phthalocyanine green, and the like can be used.

As the other external additives, silica, titanium oxide, barium titanate, fluororesin fine particles, acrylic resin fine particles and the like can be used alone or in combination. In addition, a surfactant, a polymerization agent and the like may be appropriately added.

In the developer for electrophotography according to the present invention, the carrier according to the present invention is used, and other matters are optional. That is, the above-mentioned developer for electrophotography is merely one aspect of the present invention, and can be appropriately changed within a range that does not deviate from the gist of the present invention, such as the composition of the toner. In addition, the developer for electrophotography is preferably used as a developer for replenishment.

Next, the present invention will be specifically described with reference to Examples and Comparative Examples. However, the present invention is not limited to the following Examples.

Example 1

(1) Production of Magnetic Core Material

First, each raw material was weighed so as to be 39.7 mol % in terms of MnO, 9.9 mol % in terms of MgO, 49.6 mol % in terms of $Fe_2O_3$, and 0.8 mol % in terms of SrO. After weighing the raw materials, water was added thereto, and the mixture was pulverized with a wet ball mill for 10 hours, mixed, dried, held at 950° C. for 4 hours, and then pulverized with a wet ball mill for 24 hours to prepare a slurry. The slurry was granulated, dried, held at 1,270° C. for 6 hours in an atmosphere with an oxygen concentration of 2%, and then pulverized, and perform particle size adjustment, to thereby obtain manganese-based ferrite particles. The manganese-based ferrite particles had a volume average particle diameter of 35 μm and a saturation magnetization of 70 $Am^2/kg$ when the applied magnetic field was 3000 ($10^3/4\pi \cdot A/m$). The manganese-based ferrite particles produced in this manner were used for a magnetic core material of Example 1.

(2) Preparation Step of Resin Layer Forming Liquid

For the resin layer forming liquid, fluorine element-containing resin particles and binder resin particles were dispersed in a dispersion medium. In order to satisfactorily disperse these resin particles in the dispersion medium, water to which a surfactant was added in advance was used as the dispersion medium. In the example, tetrafluoroethylene-hexafluoropropylene copolymer resin particles (FEP) having a volume average particle diameter ($D_{50}$) of 0.25 μm were used as the fluorine element-containing resin, and a polyimide resin (powder) (PI) was used as the binder resin particles. In addition, as a surfactant, polyoxyethylene alkyl ether which is a nonionic surfactant was used.

In this Example, the resin layer forming liquid was prepared by dispersing 200 g of a solid content in 1,000 ml of water containing the surfactant. The mass ratio of the fluorine element-containing resin particles and the binder resin particles was 8:2. The viscosity of the resin layer forming liquid thus prepared was 2.3 cP. In addition, the resin component concentration in the resin layer forming liquid is 16% by mass. In the other Examples and Comparative Examples, the resin component concentrations in the resin layer forming liquid were all adjusted to 16% by mass.

(3) Coating Step

The above-described manganese-based ferrite particles were used as the magnetic core material, and 200 g in terms of solid content of the resin layer forming liquid was mixed with 10 kg of the magnetic core material by using a fluidized bed coating apparatus. In this case, the coating amount of the resin mixture (fluorine element-containing resin particles and binder resin) with respect to 100 parts by mass of the magnetic core material is 2.0 parts by mass. Then, heat treatment was performed at 200° C. for 1 hour, to thereby obtain a carrier of Example 1.

Example 2

A carrier of Example 2 was produced in the same manner as in Example 1 except that in the coating step, 150 g in terms of solid content of the resin layer forming liquid was mixed with 10 kg of the magnetic core material. In this case, the coating amount of the resin mixture with respect to 100 parts by mass of the magnetic core material is 1.5 parts by mass.

Example 3

A carrier of Example 3 was produced in the same manner as in Example 1 except that in the coating step, 400 g in terms of solid content of the resin layer forming liquid was mixed with 10 kg of the magnetic core material. In this case, the coating amount of the resin mixture with respect to 100 parts by mass of the magnetic core material is 4.0 parts by mass.

Example 4

A carrier of Example 4 was produced in the same manner as in Example 1 except that when the resin layer forming liquid was prepared, the fluorine element-containing resin particles and the binder resin particles were dispersed in the dispersion medium so that the mass ratio was 6:4.

Example 5

A carrier of Example 5 was produced in the same manner as in Example 1 except that when the resin layer forming liquid was prepared, the fluorine element-containing resin particles and the binder resin particles were dispersed in the dispersion medium so that the mass ratio was 5:5.

Example 6

A carrier of Example 6 was produced in the same manner as in Example 1 except that when the resin layer forming liquid was prepared, the fluorine element-containing resin particles and the binder resin particles were dispersed in the dispersion medium so that the mass ratio was 9:1.

Example 7

A carrier of Example 7 was produced in the same manner as in Example 1 except that when the resin layer forming liquid was prepared, FEP particles having a volume average particle diameter ($D_{50}$) of 0.40 μm were used as the fluorine element-containing resin particles.

Example 8

A carrier of Example 8 was produced in the same manner as in Example 1 except that when the resin layer forming liquid was prepared, FEP particles having a volume average particle diameter ($D_{50}$) of 0.15 μm were used as the fluorine element-containing resin particles.

Example 9

A carrier of Example 9 was produced in the same manner as in Example 1 except that when the resin layer forming liquid was prepared, FEP particles having a volume average particle diameter ($D_{50}$) of 0.07 μm were used as the fluorine element-containing resin particles.

Example 10

A carrier of Example 10 was produced in the same manner as in Example 1 except that when the resin layer forming liquid was prepared, binder resin particles having a volume average particle diameter ($D_{50}$) of 0.04 μm were used.

Example 11

A carrier of Example 11 was produced in the same manner as in Example 1 except that when the resin layer forming liquid was prepared, binder resin particles having a volume average particle diameter ($D_{50}$) of 0.30 μm were used.

Example 12

A carrier of Example 12 was produced in the same manner as in Example 1 except that when the resin layer forming liquid was prepared, polyamide imide resin particles (PAI) having a volume average particle diameter ($D_{50}$) of 0.15 μm were used as the binder resin particles.

Example 13

A carrier of Example 13 was obtained in the same manner as in Example 1 except that when the resin coating layer forming liquid was prepared, the following method was employed.

First, fluorine element-containing resin particles were dispersed in a colloidal solution in which a liquid polyimide resin was dispersed in water to prepare a resin layer forming liquid. At this time, polyoxyethylene alkyl ether was used as a surfactant and the surfactant was added so that the amount of the surfactant was 4.4 parts by mass when the total amount of the fluorine element-containing resin particles and the polyimide resin in the resin layer forming liquid was 100 parts by mass. In addition, in this Example, a water-insoluble polyimide resin was used. Furthermore, as the fluorine element-containing resin, tetrafluoroethylene-hexafluoropropylene copolymer resin particles (FEP) were used. At this time, the amount of each resin added to water was adjusted so that the mass ratio of the contents of the fluorine element-containing resin particles and the polyimide resin in the resin layer forming liquid was 8:2 in terms of solid content.

The concentration of the fluorine element-containing resin and the polyimide resin in the resin layer forming liquid in terms of solid content was 16% by mass. Here, the concentration in terms of solid content is the content of the mixed resin component of the polyimide resin and the fluorine element-containing resin with respect to water as a dispersion medium expressed as a percentage (mass).

Furthermore, in the prepared resin layer forming liquid, the polyimide resin was dispersed in the dispersion medium so as to form colloidal particles having a particle diameter of 0.25 μm.

COMPARATIVE EXAMPLES

Comparative Example 1

A carrier of Comparative Example 1 was produced in the same manner as in Example 1 except that when the resin layer forming liquid was prepared, fluorine element-containing resin particles (FEP) having a volume average particle diameter ($D_{50}$) of 0.5 μm were used.

Comparative Example 2

A carrier of Comparative Example 2 was produced in the same manner as in Example 1 except that when the resin layer forming liquid was prepared, a polyimide resin that is a liquid at the normal temperature was used as the binder resin, the fluorine element-containing resin particles and the polyimide resin had a mass ratio of 5:5 in terms of solid content, and 15% by mass of a furfuryl alcohol aqueous solution was used as a dispersion medium.

Comparative Example 3

A carrier of Comparative Example 3 was produced in the same manner as in Example 1 except that when the resin layer forming liquid was prepared, a polyamide imide resin that is a liquid at the normal temperature was used as the binder resin, the fluorine element-containing resin particles and the polyamide imide resin had a mass ratio of 5:5 in terms of solid content, and 15% by mass of a furfuryl alcohol aqueous solution was used as a dispersion medium.

Comparative Example 4

A carrier of Comparative Example 4 was produced in the same manner as in Example 1 except that when the resin layer forming liquid was prepared, a polyamide imide resin that is a liquid at the normal temperature was used as the binder resin, the fluorine element-containing resin particles and the polyamide imide resin had a mass ratio of 8:2 in terms of solid content, and 15% by mass of a furfuryl alcohol aqueous solution was used as a dispersion medium.

Comparative Example 5

A carrier of Comparative Example 5 was produced in the same manner as in Example 1 except that when the resin layer forming liquid was prepared, the fluorine element-containing resin particles and the binder resin particles were dispersed in the dispersion medium at a mass ratio of 2:8.

Table 1 shows the production conditions of the carrier produced in each of Examples and Comparative Examples. Table 1 shows the type of resin of the fluorine element-containing resin particles and the volume average particle diameter ($D_{50}$) thereof, the type of resin of the binder resin and the state of the binder resin (solid or liquid), the resin coating amount (parts by mass) with respect to 100 parts by mass of the magnetic core material, the mixing ratio (mass ratio) of the fluorine element-containing resin and the binder resin used when preparing the resin layer forming liquid, the type of the dispersion medium used when preparing the resin layer forming liquid, and the viscosity of the resin layer forming liquid, used in each of Examples and Comparative Examples. The viscosity of the resin layer forming liquid was measured by using a vibration type viscometer Visco-mate (VM-1G) manufactured by Yamaichi Electronics Co., Ltd. Table 1 also shows the results of visual evaluation of the dispersibility of the fluorine element-containing resin particles in the resin layer forming liquid. In the case where the resin layer forming liquid became cloudy as a whole and no precipitate was observed at the bottom of the container, it was evaluated that the dispersibility of the fluorine element-containing resin particles in the resin layer forming liquid was good. On the other hand, in the case where the resin layer forming liquid in the upper part of the container was transparent and a precipitate was observed at the bottom of the container, it was evaluated that the dispersibility of the fluorine element-containing resin particles in the resin layer forming liquid was poor.

[Evaluation]

1. Evaluation Method

For each carrier obtained in each of Examples and Comparative Examples, the resin coverage, the film thickness of the resin coating layer and the coefficient of variation thereof, and the number of fluorine element-containing resin particles per unit area in the cross section of the resin coating layer and the coefficient of variation thereof were obtained by the following methods, respectively. In addition, the resistance of each carrier, the charge amount when using each carrier, the fogging properties, and the toner concentration were measured and evaluated by the following methods at the initial stage and after printing 100,000 times (after 100 k), respectively.

(1) Method for Calculating Resin Coverage

By using an electron microscope (JSM-6060A type) manufactured by JEOL Ltd., reflection electron images of each carrier were photographed at a magnification of 450 times and an applied voltage of 5 kV. The image was converted into an image of only carrier particles by using image analysis software "Image Pro Plus" produced by Media Cybernetics, and then binarization processing was performed on the particles whose overall shape could be confirmed. In the case of the carriers produced in Examples and Comparative Examples, about 20 to 25 particles whose overall shape could be confirmed were included in the image taken in one field of view. All the particles (about 20 particles to 25 particles) whose overall shape could be confirmed included in the image were set as the target particles for the binarization processing. The image was separated into black portions (resin coating portions) and white portions (magnetic core material exposed portions) by the binarization processing, and the areas of the black portion and the white portion in each carrier were measured. Then, the resin coverage (%) was calculated by the following expression. The evaluation results are shown in Table 2.

$$\text{Resin coverage (\%)}=\{\text{area of black portion}/(\text{area of black portion}+\text{area of white portion})\}\times 100$$

(2) Method for Measuring Film Thickness of Resin Coating Layer

A sample was prepared by the following method, and the film thickness of the resin coating layer was measured by the following method by using the sample.

When preparing a sample, first, the carrier was embedded in resin of Petripoxy 154, which is an epoxy resin. The cross section of the carrier was prepared by irradiating the carrier with an ion beam by using an ion milling apparatus (IM4000plus) manufactured by Hitachi High-Technologies Corporation.

The irradiation conditions of the ion beam are as follows.

Atmosphere: Argon

Ion beam acceleration voltage: 6.0 kV

Milling tilt angle: 0 degrees

By using the sample prepared as described above, the film thickness of the resin coating layer was measured as follows. First, the sample was photographed with a scanning electron microscope (SU8000 series, manufactured by Hitachi High-Technologies Corporation) at an acceleration voltage of 5 kV and a working distance of 2 mm, and secondary electron image information of the cross section of the carrier was acquired.

When acquiring the secondary electron image information of the cross section of the carrier, the sample was first photographed at a low magnification (700 times), and 100 particles of the carrier used for measuring the film thickness of the resin coating layer (hereinafter, referred to as "particle to be measured") was randomly selected. In the case of the carriers produced in Examples and Comparative Examples, about 10 particles whose overall shape could be confirmed were included in the image taken at 700 times in one field of view. All the particles, whose overall shape could be confirmed, included in the image, were set as the particles to be measured, and about 10 places were photographed by changing the field of view so that the number of particles to be measured was 100 particles.

Next, each particle to be measured was photographed at a high magnification (10,000 times), cross-sectional image information of each particle to be measured was acquired, the film thickness of the resin coating layer was measured at each of 10 random places for each particle to be measured by using image analysis software "Image Pro Plus" produced by Media Cybernetics, and the average value of the film thicknesses at the 10 places was taken as the film thickness of the resin coating layer of the particle to be measured.

Then, after measuring the film thickness of the resin coating layer for each of 100 particles to be measured, the average film thickness of the resin coating layer of 100 particles to be measured was obtained.

By using the average film thickness ($x_d$) of the resin coating layer thus obtained, the film thickness of the resin coating layer of each measurement particle, and the like, the standard deviation ($s_d$) of the film thickness of the resin coating layer for each sample was obtained, and the coefficient of variation ($CV_d$) of the film thickness of the resin coating layer was obtained for each sample according to the following expression. In the present invention, the coefficient of variation is expressed as a percentage.

$$\text{Coefficient of variation of film thickness of resin coating layer } (CV_d)=(\text{Standard deviation of film thickness of resin coating layer } (s_d)/\text{average film thickness of resin coating layer } (x_d))\times 100\ (\%)$$

(3) Method for Measuring Number of Fluorine Element-Containing Resin Particles Per Unit Area A sample was prepared in the same manner as when the film thickness of the resin coating layer was measured, and 100 particles of particles to be measured were randomly selected in the same manner as when the film thickness of the resin coating layer was measured. For each particle to be measured, the number of fluorine element-containing resin particles per unit area in the cross section of the resin coating layer was counted as follows, and the average value and the coefficient of variation were obtained.

First, by using an EDS apparatus (energy dispersive X-ray analyzer, X-max, manufactured by Horiba, Ltd.), each sample was EDS-scanned at an acceleration voltage of 5 kV and a WD of 15 mm to clarify the presence place of the fluorine element-containing resin particles. Then, in the resin coating layer of one particle to be measured, an area of 0.25 μm×0.25 μm was randomly selected as an area to be measured. Then, the number of fluorine element-containing resin particles included in the area to be measured was counted. At that time, only the particles in which the entire fluorine element-containing resin particle was within the area to be measured were counted.

Then, the number of fluorine element-containing particles present in the area to be measured was counted for 100 particles to be measured in the same manner as described above. When the number of fluorine element-containing particles in the area to be measured of each particle to be measured was denoted $n_1$, $n_2$, $n_3$ . . . , $n_{100}$, and the total value thereof was denoted N ($=n_1+n_2+n_3+ \ldots +n_{100}$), based on the following expression, the average value ($x_N$) of the number of fluorine element-containing resin particles per unit area (1 $\mu m^2$) in the cross section of the resin coating layer of the carrier was obtained for each sample.

$$x_N=N\times 16/100$$

In addition, for the sake of convenience, for each sample, the number of fluorine element-containing resin particles per unit area in the cross section of the resin coating layer of the particle to be measured was denoted $n_1\times 16$, $n_2\times 16$, . . . , $n_{100}\times 16$, respectively, these respective values and the standard deviation ($s_N$) of the number of fluorine element-containing resin particles per unit area in the cross section of the resin coating layer was obtained for each sample, and the coefficient of variation ($CV_N$) of the number of fluorine element-containing resin particles per unit area in the cross section of the resin coating layer was obtained for each sample according to the following expression. In the present invention, the coefficient of variation is expressed as a percentage as described above.

(4) Electric Resistance (Volume Resistivity)

By using the carrier obtained in each of Examples and Comparative Examples as a sample, the electric resistance was measured as follows. First, a cylinder formed of a fluororesin having a cross-sectional area of 4 $cm^2$ was filled with a sample so that the height was 4 mm, electrodes were attached to the both ends, a weight of 1 kg was put thereon, and then the resistance was measured. In the measurement the resistance, while gradually increasing the applied voltage by 50 V every 5 seconds up to an application voltage of 1,000 V (electric field 2,500 V/cm), the current value 5 seconds after the voltage was applied at each voltage was read, and the resistance value at each voltage was calculated, by using an electrometer (insulation resistance tester, model 6517A, manufactured by Keithley Instruments Inc.). Thereafter, the volume resistivity (Ω) was obtained from the cross-sectional area and height.

(5) Charge Amount

In order to evaluate the charge amount, first, a developer for electrophotography having a toner concentration of 5% by mass was prepared by using each carrier and a commercially available toner (toner (T09C-01), manufactured by Kyocera Document Solutions, color: cyan).

By using the above-described developer for electrophotography, the charge amount (uC/g) was measured under the following normal temperature and normal humidity environment by a suction type charge amount measuring apparatus (Epping q/m-meter, manufactured by PES-Laboratoriumu).

Normal temperature and normal humidity environment (NN environment): temperature of 20° C. to 25° C., and relative humidity of 50% to 60%

As the measurement of the charge amount, an initial value and a value after 100,000 times durable printing (after 100 K) of image printing by a color multifunction peripheral (KM-C2630) manufactured by Kyocera Document Solutions Co., Ltd., using the developer for electrophotography, were measured. Then, the NN charge amounts at the initial stage and after 100 K were regarded as “initial charge amount” and “charge amount after 100 K”, respectively. The results for the charge amount are shown in Table 3.

(6) Fogging

By using the above-described developer for electrophotography, an image was printed by a color multifunction peripheral (KM-C2630) manufactured by Kyocera Document Solutions Co., Ltd., and fogging was evaluated at the initial stage and after 100,000 times durable printing (after 100 K). Fogging was measured by using a color difference meter Z-300A manufactured by Nippon Denshoku Industries Co., Ltd. The fogging target value is 5 or less. The results are shown in Table 3.

(7) Carrier Adhesion

By using the above-described developer for electrophotography, carrier adhesion was evaluated as follows. In a constant temperature and humidity room where the atmospheric temperature and humidity were adjusted to a high temperature and high humidity environment (at 30° C. and relative humidity 80%), after a test image was printed 1,000 (1 k) under appropriate exposure conditions by using a color multifunction peripheral (KM-C2630) manufactured by Kyocera Document Solutions Co., Ltd., 3 sheets of a solid image was printed, and the total of the amounts of carrier adhesion in the images were counted. Adhesion of 10 carriers or less was evaluated as A, adhesion of 10 to 15 carriers was evaluated as B, and adhesion of 15 or more carriers was evaluated as C.

(8) Spent Amount

The toner was removed by suction from the developer for electrophotography after durable printing by using a mesh of 635 Mesh, to extract the carrier after 100 K durable printing. Then, the carbon content of the carrier and that of the carrier after durable printing were measured by using a carbon analyzer C-200 type (oxygen gas: 2.5 $kg/cm^2$, nitrogen gas: 2.8 $kg/cm^2$) manufactured by LECO, and the spent amount was calculated by the following expression.

Spent amount (%)={(carbon content of carrier after durable printing)−(carbon content of carrier)}/(carbon content of carrier)

2. Evaluation Results

For the carrier produced in each Example, it was confirmed that the resin coverage was in a range of 62% to 90%, the standard deviation ($s_d$) of the resin coating layer was in a range of 0.09 to 0.21, the coefficient of variation ($CV_d$) of the film thickness was in a range of 9.3% to 21.9%, and a resin coating layer having a high resin coverage and a small variation in film thickness was formed on the surface of the magnetic core material. Furthermore, in the carrier produced in each Example, it was confirmed that the average value of the number of fluorine element-containing resin particles per unit area in the cross section of the resin coating layer was 3.1 particles/$\mu m^2$ to 196.9 particles/$\mu m^2$, and the fluorine element-containing resin particles were contained in the resin coating layer at a relatively high filling density. In addition, it was confirmed that the coefficient of variation ($CV_N$) was 3.0% to 19.1%, the variation in the distribution of the fluorine element-containing resin particles in the resin coating layer was also small, and the fluorine element-containing resin particles were evenly dispersed in the resin coating layer. Furthermore, it was confirmed that the carrier in each of Examples had a high electric resistance and a high charge amount at the initial stage, and the variation of these values was small even after 100 k printing. As a result, good results were obtained in terms of toner concentration, fogging properties, and carrier adhesion both at the initial stage and after 100 k printing. In addition, the spent amount was 10.5% at the most, which was a good result. That is, a carrier having better spent resistance and charge stability as compared with the conventional carriers can be obtained by using the carrier according to the present invention.

It was confirmed that such the carrier according to the present invention could be obtained by when preparing a resin layer forming liquid, preparing a resin layer forming liquid by dispersing (suspending/emulsifying) a binder resin in a dispersion medium instead of dissolving the binder resin in a solvent. For example, it is considered that as in Examples 1 to 12, by using a polyimide resin or polyamide imide resin as a binder resin in a solid (particulate) and dispersing the resin in a dispersion medium together with the fluorine element-containing resin particles, an increase in viscosity of the resin layer forming liquid can be suppressed, the fluorine element-containing resin particles and the binder resin particles can be satisfactorily mixed to improve coatability, the filling density of the fluorine element-containing resin particles in the resin coating layer can be increased, and the variation in the distribution can be reduced. Also, in the case of using a liquid binder resin instead of the method using a solid binder resin, for example, as in Example 13, by dispersing (emulsifying) the binder resin in a dispersion medium in the form of micelles by using a surfactant, an increase in the viscosity of the resin layer forming liquid can be suppressed. Therefore, it can be confirmed that even when the resin layer forming liquid is prepared by the method, a carrier equivalent to the carriers of Example 1 to Example 12 according to the present invention can be obtained.

On the other hand, the carrier of Comparative Example 1 had a relatively high resin coverage of 69%, but the coefficient of variation of the number of fluorine element-containing resin particles per unit area in the cross section of the resin coating layer was as large as 24.8%. In Comparative Example 1, it is considered that such a result is obtained since the particle diameter of the fluorine element-containing resin particles is larger than that in Examples. In all of the carriers of Comparative Example 2 to Comparative Example 4, the resin coverage was as low as less than 60%, and the coefficient of variation of the film thickness of the resin coating layer was as extremely large as 41.0% to 70.1%. In addition, the value of the coefficient of variation of the number of fluorine element-containing resin particles per unit area in the cross section of the resin coating layer was also as high as 34.4% to 45.1%. It is considered that since the liquid binder resin was used and the furfuryl alcohol aqueous solution was as the dispersion medium when preparing the resin layer forming liquid, the binder resin was partially dissolved in the furfuryl alcohol aqueous solution and as a result, the viscosity of the resin layer forming liquid is increased (refer to Table 1), and the coatability deteriorates when forming the resin coating layer on the surface of the magnetic core material. On the other hand, in Examples 13 and 14, although a liquid binder resin was used, unlike Comparative Examples, the binder resin was dispersed (emulsified) in a dispersion medium in the form of micelles, and thus good coatability can be maintained. Furthermore, in Comparative Example 5, since the mass ratio of the binder resin used when preparing the resin layer forming liquid was larger than that in Example 1 to Example 12, the viscosity of the resin layer forming liquid was higher than that in Examples (refer to Table 1). The coefficient of variation of the film thickness of the resin coating layer was 23.8%, and it was considered that the variation is not large. However, the coefficient of variation of the number of fluorine element-containing resin particles per unit area in the cross section of the resin coating layer was as high as 26.9%. In the carriers of Comparative Example 1 to Comparative Example 5, the coefficient of variation of the film thickness of the resin coating layer and/or the coefficient of variation of the number of fluorine element-containing resin particles per unit area in the cross section of the resin coating layer were outside the scope of the present invention, and fogging and carrier adhesion after 100 k printing could not be suppressed. In addition, all of Comparative Example 1 to Comparative Example 5 had a large spent amount and are inferior in spent resistance as compared with Examples. It is considered that this result is caused since in Comparative Example 1, the deviation in the film thickness of the resin coating layer was large, the resin coating layer did not adhere to the surface of the magnetic core material with a uniform thickness, and spent easily occurred in the recessed portion. In Comparative Example 2 to Comparative Example 4, it is considered that the deviation of the number of fluorine element-containing resin particles was large, and there was a portion containing no fluorine element-containing resin particle, that is, a portion in which the binder resin was localized in the resin coating layer. It is considered that spent easily occurs in the portion where the binder resin is localized. In Comparative Example 5, it is considered that the amount of spent was increased because the amount of the binder resin was too large.

TABLE 1

| | Fluorine element-containing resin particle | | Binder | | | State of resin layer forming liquid | Resin coating amount | Mixing ratio | | |
|---|---|---|---|---|---|---|---|---|---|---|
| | Type of resin | Particle diameter | Type of resin | State | Particle diameter (μm) | | Coating amount (parts) | Fluorine element-containing resin particle | Binder | Viscosity (cP) |
| Ex. 1 | FEP | 0.25 | PI | Solid | 0.15 | Suspended | 2.0 | 8.0 | 2.0 | 2.3 |
| Ex. 2 | FEP | 0.25 | PI | Solid | 0.15 | Suspended | 1.5 | 8.0 | 2.0 | 2.2 |
| Ex. 3 | FEP | 0.25 | PI | Solid | 0.15 | Suspended | 4.0 | 8.0 | 2.0 | 2.3 |
| Ex. 4 | FEP | 0.25 | PI | Solid | 0.15 | Suspended | 2.0 | 6.0 | 4.0 | 5.2 |
| Ex. 5 | FEP | 0.25 | PI | Solid | 0.15 | Suspended | 2.0 | 5.0 | 5.0 | 7.6 |
| Ex. 6 | FEP | 0.25 | PI | Solid | 0.15 | Suspended | 2.0 | 9.0 | 1.0 | 2.0 |
| Ex. 7 | FEP | 0.40 | PI | Solid | 0.15 | Suspended | 2.0 | 8.0 | 2.0 | 2.2 |
| Ex. 8 | FEP | 0.15 | PI | Solid | 0.15 | Suspended | 2.0 | 8.0 | 2.0 | 2.2 |
| Ex. 9 | FEP | 0.07 | PI | Solid | 0.15 | Suspended | 2.0 | 8.0 | 2.0 | 2.1 |
| Ex. 10 | FEP | 0.25 | PI | Solid | 0.04 | Suspended | 2.0 | 8.0 | 2.0 | 2.0 |
| Ex. 11 | FEP | 0.25 | PI | Solid | 0.30 | Suspended | 2.0 | 8.0 | 2.0 | 2.2 |
| Ex. 12 | FEP | 0.25 | PAI | Solid | 0.15 | Suspended | 2.0 | 8.0 | 2.0 | 2.1 |
| Ex. 13 | FEP | 0.25 | PI | Liquid | — | Emulsified | 2.0 | 8.0 | 2.0 | 1.8 |
| Comp. Ex. 1 | FEP | 0.50 | PI | Solid | 0.15 | Suspended | 2.0 | 8.0 | 2.0 | 2.1 |
| Comp. Ex. 2 | FEP | 0.25 | PI | Liquid | — | Diluted | 2.0 | 5.0 | 5.0 | 140.0 |
| Comp. Ex. 3 | FEP | 0.25 | PAI | Liquid | — | Diluted | 2.0 | 5.0 | 5.0 | 860.0 |
| Comp. Ex. 4 | FEP | 0.25 | PAI | Liquid | — | Diluted | 2.0 | 8.0 | 2.0 | 160.0 |
| Comp. Ex. 5 | FEP | 0.25 | PI | Solid | 0.15 | Suspended | 2.0 | 1.0 | 9.0 | 50.0 |

* FEP: tetrafluoroethylene-hexafluoropropylene copolymer
* PI: polyimide resin
* PAI: polyamide imide resin

TABLE 2

| | Coating layer | | | | Fluorine element-containing resin particle in coating layer | | |
|---|---|---|---|---|---|---|---|
| | Coverage | Average (μm) | Deviation | Coefficient of variation | Average (particles/μm$^2$) | Deviation | Coefficient of variation |
| Ex. 1 | 78% | 1.1 | 0.11 | 10.1% | 14.9 | 0.99 | 6.6% |
| Ex. 2 | 62% | 0.58 | 0.09 | 15.8% | 14.3 | 1.12 | 7.8% |
| Ex. 3 | 90% | 1.8 | 0.17 | 9.3% | 14.5 | 0.95 | 6.6% |
| Ex. 4 | 77% | 1.0 | 0.18 | 17.7% | 10.6 | 1.44 | 13.6% |
| Ex. 5 | 77% | 1.0 | 0.21 | 21.9% | 9.4 | 1.80 | 19.1% |
| Ex. 6 | 80% | 1.1 | 0.10 | 9.5% | 15.3 | 0.89 | 3.0% |
| Ex. 7 | 75% | 1.3 | 0.18 | 11.3% | 3.1 | 1.20 | 7.6% |
| Ex. 8 | 79% | 1.0 | 0.12 | 10.3% | 35.9 | 0.81 | 6.1% |
| Ex. 9 | 79% | 1.1 | 0.10 | 9.8% | 196.9 | 0.70 | 5.8% |
| Ex. 10 | 80% | 1.1 | 0.09 | 9.8% | 15.3 | 0.80 | 7.0% |
| Ex. 11 | 78% | 1.0 | 0.14 | 12.0% | 14.7 | 1.50 | 7.5% |
| Ex. 12 | 68% | 1.0 | 0.13 | 11.5% | 14.6 | 1.02 | 7.9% |
| Ex. 13 | 79% | 1.0 | 0.11 | 9.9% | 14.9 | 0.87 | 6.5% |
| Comp. Ex. 1 | 69% | 1.5 | 0.30 | 20.0% | 1.5 | 0.82 | 54.7% |
| Comp. Ex. 2 | 55% | 0.8 | 0.49 | 61.3% | 9.4 | 3.23 | 34.4% |
| Comp. Ex. 3 | 58% | 0.8 | 0.54 | 70.1% | 7.9 | 3.56 | 45.1% |
| Comp. Ex. 4 | 56% | 1.0 | 0.41 | 41.0% | 12.3 | 3.92 | 31.9% |
| Comp. Ex. 5 | 60% | 1.6 | 0.38 | 23.8% | 7.8 | 2.10 | 26.9% |

TABLE 3

| | Initial evaluation | | | | | Evaluation after 100 k | | | | | |
|---|---|---|---|---|---|---|---|---|---|---|---|
| | Charge amount (uC/g) | Toner concen-tration (%) | Fogging | Carrier adhesion | Resistance (LogΩ) | Charge amount (uC/g) | Toner concen-tration (%) | Fogging | Carrier adhesion | Resistance (LogΩ) | Spent amount (%) |
| Ex. 1 | 33.8 | 4.9 | 1 | A | 10.9 | 42.2 | 5.0 | 1 | A | 10.3 | 6.5 |
| Ex. 2 | 22.5 | 4.8 | 3 | A | 9.5 | 20.4 | 4.6 | 4 | A | 8.9 | 4.1 |
| Ex. 3 | 46.7 | 4.9 | 1 | A | 12.1 | 39.3 | 4.9 | 1 | A | 11.5 | 10.5 |
| Ex. 4 | 32.5 | 4.9 | 2 | A | 11.0 | 40.3 | 4.7 | 2 | A | 10.4 | 7.2 |

TABLE 3-continued

| | Initial evaluation | | | | | Evaluation after 100 k | | | | | |
|---|---|---|---|---|---|---|---|---|---|---|---|
| | Charge amount (uC/g) | Toner concen-tration (%) | Fogging | Carrier adhesion | Resistance (LogΩ) | Charge amount (uC/g) | Toner concen-tration (%) | Fogging | Carrier adhesion | Resistance (LogΩ) | Spent amount (%) |
| Ex. 5 | 31.1 | 4.8 | 3 | A | 11.2 | 39.3 | 4.7 | 4 | A | 10.6 | 8.6 |
| Ex. 6 | 35.2 | 4.8 | 1 | A | 11.0 | 43.8 | 5.0 | 1 | A | 10.1 | 4.4 |
| Ex. 7 | 31.2 | 4.9 | 2 | A | 10.9 | 39.3 | 4.9 | 3 | A | 10.0 | 6.6 |
| Ex. 8 | 32.9 | 4.8 | 1 | A | 11.2 | 42.3 | 4.9 | 1 | A | 10.1 | 6.0 |
| Ex. 9 | 33.6 | 4.9 | 1 | A | 11.1 | 40.9 | 4.7 | 1 | A | 10.3 | 5.7 |
| Ex. 10 | 33.4 | 4.9 | 1 | A | 11.0 | 38.0 | 4.7 | 1 | A | 10.4 | 6.4 |
| Ex. 11 | 33.9 | 4.8 | 1 | A | 11.1 | 40.0 | 5.0 | 1 | A | 10.6 | 7.2 |
| Ex. 12 | 32.1 | 4.9 | 2 | A | 11.2 | 41.3 | 4.7 | 2 | A | 10.4 | 7.0 |
| Ex. 13 | 33.0 | 4.9 | 1 | A | 11.2 | 41.0 | 4.7 | 1 | A | 10.2 | 7.2 |
| Comp. Ex. 1 | 20.2 | 4.8 | 7 | A | 10.3 | 15.4 | 4.9 | 9 | C | 7.5 | 15.0 |
| Comp. Ex. 2 | 44.7 | 4.7 | 4 | B | 9.0 | 35.2 | 4.9 | 6 | C | 7.8 | 25.1 |
| Comp. Ex. 3 | 33.2 | 4.8 | 4 | C | 9.4 | 27.6 | 4.6 | 6 | C | 8.0 | 28.4 |
| Comp. Ex. 4 | 34.0 | 4.6 | 3 | C | 9.0 | 37.3 | 4.5 | 7 | C | 8.0 | 26.5 |
| Comp. Ex. 5 | 20.4 | 4.8 | 3 | B | 9.4 | 20.0 | 4.8 | 5 | C | 8.5 | 20.0 |

INDUSTRIAL APPLICABILITY

According to the present invention, it is possible to provide a carrier having better spent resistance and charge stability than conventional carriers, and a method for producing the carrier.

The invention claimed is:

1. A carrier comprising: a magnetic core material; and a resin coating layer coating a surface of the magnetic core material, wherein the resin coating layer comprises a binder resin, and fluorine element-containing resin particles dispersed in the binder resin, the resin coating layer has a thickness of 0.5 μm or more and 2.0 μm or less, the resin coating layer has a coefficient of variation of the thickness of 25% or less, and the resin coating layer has an average value of the number of the fluorine element-containing resin particles being 3 particles/$\mu m^2$ or more and 350 particles/$\mu m^2$ or less per unit area in a cross section of the resin coating layer, and has a coefficient of variation of the average value of the number of the fluorine element-containing resin particles being 20% or less, wherein the fluorine element-containing resin particles have a volume average particle diameter (D50) of 0.05 μm or more and 0.40 μm or less, the fluorine element-containing resin particles consist of a tetrafluoroethylene-hexafluoropropylene (FEP) copolymer, the binder resin is a polyimide (PI) resin or a polyamide imide (PAI) resin, and the magnetic core material is formed of a ferrite particle.

2. The carrier according to claim 1, wherein a surface coverage of the magnetic core material by the resin coating layer is 60% or more and 95% or less.

3. The carrier according to claim 1, wherein the resin coating layer has a mass ratio of a content of the fluorine element-containing resin particles to a content of the binder resin being 9:1 to 2:8.

4. The carrier according to claim 1, wherein the binder resin is a polyimide resin.

5. A developer for electrophotography, comprising: the carrier described in claim 1; and a positively chargeable toner, wherein the carrier imparts a positive chargeability to the toner.

* * * * *